No. 861,062. PATENTED JULY 23, 1907.
B. A. VAN WORMER & G. W. MOUDY.
NUT LOCK.
APPLICATION FILED NOV. 1, 1906.
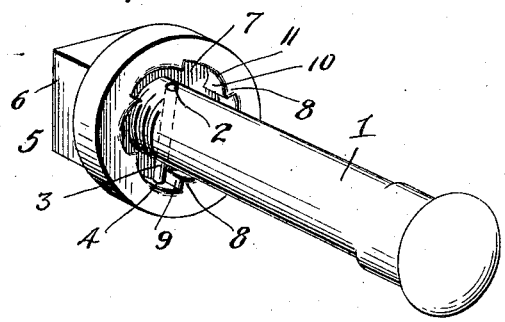
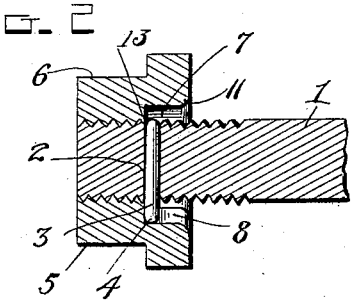
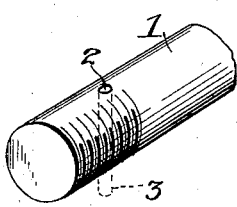
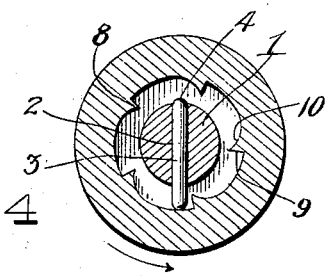
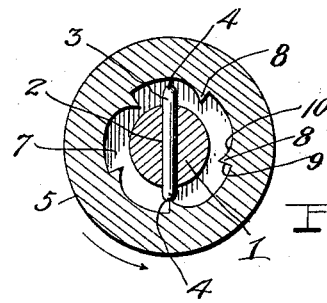
Witnesses
Inventors
Bernard A. Van Wormer
George W. Moudy
by Watson E. Coleman
Attorney

UNITED STATES PATENT OFFICE.

BERNARD A. VAN WORMER AND GEORGE W. MOUDY, OF WEST UNITY, OHIO.

NUT-LOCK.

No. 861,062.  Specification of Letters Patent.  Patented July 23, 1907.

Application filed November 1, 1906. Serial No. 341,566.

*To all whom it may concern:*

Be it known that we, BERNARD A. VAN WORMER and GEORGE W. MOUDY, citizens of the United States, residing at West Unity, in the county of Williams and State of Ohio, have invented certain new and useful Improvements in Nut-Locks, of which the following is a specification, reference being had therein to the accompanying drawing.

This invention relates to improvements in nut locks, and more particularly to that class of such devices in which the nut is locked upon the bolt.

The object of the invention is to provide a simple, practical and effective nut lock whereby a nut may be readily screwed upon the bolt and held thereon against accidental displacement or removal and which can only be removed by the application of sufficient force to break the locking means.

Other objects and advantages of this invention, as well as the structural features by means of which they are attained, will be made clear by an examination of the specification, taken in connection with the accompanying drawing, in which the same reference numerals indicate corresponding portions throughout, and in which Figure 1 is a perspective view of the complete device; Fig. 2 is a fragmentary longitudinal section; Fig. 3 is a detail perspective view of the threaded end of the bolt; and Figs. 4 and 5 are transverse sectional views showing the locking pin in different positions.

Referring to the drawings by numeral 1 denotes a bolt of ordinary construction formed at its threaded end with a transverse opening 2 through which is adapted to slide a pawl 3 in the form of a cylindrical pin. This pin or pawl is preferably formed of some brittle metal and has rounded ends, as shown at 4. 5 designates a nut adapted to engage the threaded end of the bolt and having its outer end 6 square or of other polygonal form and its inner end formed with a circular enlargement in which is provided an annular cavity or recess 7. The wall of this recess is formed with ratchet teeth 8 adapted to be engaged by the pin or pawl 3, as shown in Figs. 4 and 5. One side or wall 9 of each of the teeth 8 is straight and projects radially, while the other side or wall is curved or slants, as shown at 10. The outer edges of these teeth are also preferably rounded, as shown at 11, for a purpose presently explained.

In operation, the nut 5 is screwed on the threaded end of the bolt until the teeth 8 engage the slidably mounted pin or pawl 3. Owing to the rounded edges 11 of the teeth it will be seen that the pin will readily engage the latter. As the nut is turned in the direction of the arrows in Figs. 4 and 5 it will be observed that the teeth 8 will successively contact the rounded ends of the pin which latter, as it engages the curved sides 10 of the teeth will ride up the same and be forced upwardly through the nut until it drops in rear of the vertical walls 9 of the teeth. The pin is thus reciprocated in the opening 2 in the bolt until it contacts with the shoulder 13 formed by the bottom of the cavity or recess 7 in the nut. When the nut is turned in the reverse direction to unscrew it, one end of the pin contacts with the vertical wall 9 of one of the teeth and holds the nut against rotation. If it is desired to remove the nut, sufficient force must be brought to bear thereon by a wrench or similar tool, to break the pin, whereupon the nut may be unscrewed from the bolt. When the nut is replaced, a new pin is substituted for the broken one. These pins can be made of inexpensive material so that the cost thereof will be very slight; and by making them sufficiently strong to withstand any ordinary strain, a practical, simple and inexpensive nut lock is provided and one whereby the nut is effectually held against casual removal or displacement.

It is thought that from the foregoing description, taken in connection with the accompanying drawings, the construction, operation and advantages of the invention will be obvious and a further explanation is not deemed necessary.

Having thus described our invention, what we claim as new, and desire to secure by Letters Patent of the United States, is:

1. In a nut lock, a threaded bolt having a vertically disposed transverse opening, a nut having an annular cavity concentric with its threaded opening and formed in its outer side wall with an annular series of ratchet teeth, and a pin freely slidable in the opening in said bolt and adapted to drop by gravity into engagement with said ratchet teeth, said pin being reciprocated by said ratchet teeth when the nut is screwed upon the bolt, substantially as described.

2. In a nut lock, a threaded bolt having a vertically disposed transverse opening extending entirely through the same, a pin slidably mounted in said opening and of greater length than the diameter of said bolt, and a nut having an annular cavity concentric with its threaded opening, said cavity being formed upon its outer side wall with an annular series of ratchet teeth, each of the latter having a radially projecting wall and a sloping or inclined wall, said pin being adapted to engage said ratchet teeth and to be reciprocated transversely in said bolt by the inclined walls of said teeth, substantially as set forth.

3. In a nut lock, a threaded bolt having a vertically disposed transverse opening extending entirely through the same, a pin slidably mounted in said opening, said pin having rounded ends and being of greater length than the diameter of the bolt, and a nut having in one of its faces an annular cavity arranged concentric with its threaded opening, said cavity having its outer side wall formed with an annular series of ratchet teeth, each of the latter having a radially projecting wall and an inclined or sloping wall, the outer edges of said ratchet teeth being rounded to permit of a ready engagement of said pin therewith in the application of the nut to the bolt, substantially as shown and for the purposes set forth.

4. In a nut lock, a threaded bolt having a vertically disposed transverse opening extending entirely through the same, a nut having an annular cavity concentric with its threaded opening and formed in its outer side wall with an annular series of ratchet teeth, and a pin freely slidable in the opening in the bolt and of greater length than the diameter of the bolt whereby its lower end will project into the cavity in the nut and engage said ratchet teeth, said pin being of brittle material whereby it may be broken, for the purpose set forth.

In testimony whereof we hereunto affix our signatures in presence of two witnesses.

BERNARD A. VAN WORMER.
GEORGE W. MOUDY.

Witnesses:
LOREN V. ROGERS,
THOMAS E. ALLEN.